United States Patent
Hong

(10) Patent No.: US 10,817,707 B2
(45) Date of Patent: Oct. 27, 2020

(54) ATTACK SAMPLE GENERATING METHOD AND APPARATUS, DEVICE AND STORAGE MEDIUM

(71) Applicant: BAIDU ONLINE NETWORK TECHNOLOGY (BEIJING) CO., LTD., Haidian District Beijing (CN)

(72) Inventor: Zhibin Hong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 238 days.

(21) Appl. No.: 16/034,725

(22) Filed: Jul. 13, 2018

(65) Prior Publication Data
US 2019/0034703 A1    Jan. 31, 2019

(30) Foreign Application Priority Data

Jul. 26, 2017    (CN) .................. 2017 1 06190249

(51) Int. Cl.
*G06K 9/00* (2006.01)
*G06K 9/62* (2006.01)

(52) U.S. Cl.
CPC ..... *G06K 9/00288* (2013.01); *G06K 9/00228* (2013.01); *G06K 9/00899* (2013.01); *G06K 9/6256* (2013.01)

(58) Field of Classification Search
CPC ........... G06K 9/00288; G06K 9/00228; G06K 9/00899; G06K 9/6256; G06K 9/00221
See application file for complete search history.

(56) References Cited

U.S. PATENT DOCUMENTS

| 2003/0207981 A1 | 11/2003 | Zhou et al. |
| 2018/0232878 A1* | 8/2018 | Braun ................ G06T 7/20 |
| 2019/0286847 A1* | 9/2019 | Kato ................ G06F 21/602 |

FOREIGN PATENT DOCUMENTS

| CN | 101707532 A | 5/2010 |
| CN | 102622604 A | 8/2012 |

OTHER PUBLICATIONS

Chinese Office Action dated Mar. 30, 2020, for related Chinese Appln. No. 201710619024.9; 4 Pages.
Chinese Search Report dated Mar. 23, 2020 for related Chinese Appln. No. 2017106190249; 2 Pages.

* cited by examiner

*Primary Examiner* — Wayne H Cai
(74) *Attorney, Agent, or Firm* — Brooks Kushman PC

(57) ABSTRACT

The present disclosure provides an attack sample generating method and apparatus, a device and a storage medium, wherein the method comprises: training a generative network which is used to generate an attack picture with a real person's picture; upon completion of training, using the generative network to generate an attack picture, and regarding the generated attack picture as the attack sample. The solution of the present disclosure can be applied to overcome the problem of insufficiency of the attack samples.

12 Claims, 3 Drawing Sheets

ATTACK SAMPLE GENERATING METHOD AND APPARATUS, DEVICE AND STORAGE MEDIUM

The present application claims the priority of Chinese Patent Application No. 201710619024.9, filed on Jul. 26, 2017, with the title of "Attack sample generating method and apparatus, device and storage medium". The disclosure of the above applications is incorporated herein by reference in its entirety.

FIELD OF THE DISCLOSURE

The present disclosure relates to computer application technologies, and particularly to an attack sample generating method and apparatus, a device and a storage medium.

BACKGROUND OF THE DISCLOSURE

As compared with other biological feature recognition technologies, a human face recognition technology has unique advantages in practical application: human face can be directly acquired via a camera, and the recognition procedure may be completed in a non-contacting manner conveniently and quickly.

Currently, human face recognition technology is already applied to many fields such as financing, education, scenic spots, travel and transport and social insurance. However, the human face recognition technology brings about convenience as well as some problems. For example, human face can be easily acquired so that human face can be duplicated by some people in a picture or video manner to achieve the purpose of stealing information. Particularly in the new financing industry, human face recognition technology is already gradually applied to remote account opening, money withdrawal, payment and so on, and involves users' interests.

To this end, a living body detection technology is proposed in the prior art. Plainly speaking, the so-called living body detection means detecting that the face corresponds to a "living person" during human face recognition.

Sources of non-living bodies (namely, attacks) are wide, and include photos and video displayed on a mobile phone or Pad, and printed photos on different materials (including curving, folding, clipping and hole-digging in various cases), and so on.

The living body detection is applied on important occasions such as social insurance and online account opening. For example, pension cannot be withdrawn unless an elderly user's identity is determined authentic and the elderly user is still alive through verification. Upon online account opening, this can ensure authenticity, validity and safety of the user information.

In a conventional living body detection manner, it is usual to use a camera to acquire user pictures, and then use a classification model to distinguish whether the user in the user pictures is a living body, and correspondingly it is necessary to pre-train with draining data to obtain the classification model.

The training data need to include positive samples and negative samples. The positive samples refer to picture samples obtained by photographing a real person (living person). The negative samples refer to attack samples (attack pictures).

It is usually difficult to obtain attack samples. Once attack samples are insufficient, this will cause the training effect of the classification model undesirable and then affect subsequent living body detection result.

SUMMARY OF THE DISCLOSURE

In view of the above, the present disclosure provides an attack sample generating method and apparatus, a device and a storage medium, which can overcome the problem of insufficiency of the attack samples.

Specific technical solutions are as follows:

An attack sample generating method, comprising:

training a generative network which is used to generate an attack picture with a real person's picture;

upon completion of training, using the generative network to generate an attack picture, and regarding the generated attack picture as the attack sample.

According to a preferred embodiment of the present disclosure, the generating an attack picture with a real person's picture comprises:

using the real person's picture and noise to generate the attack picture.

According to a preferred embodiment of the present disclosure, the training the generative network comprises:

training a generative adversarial network formed by the generative network and a discriminative network;

wherein the discriminative network is used to discriminate whether an input picture is a real person's picture or an attack picture.

According to a preferred embodiment of the present disclosure, the method further comprises:

upon training, using a supervision network to define content of the attack picture generated by the generative network.

According to a preferred embodiment of the present disclosure, the defining content of the attack picture generated by the generative network comprises:

defining that a human face ID in the generated attack picture does not change as compared with real person's picture used to generate the attack picture.

An attack sample generating apparatus, comprising: a network training unit and a sample generating unit;

the network training unit is configured to train a generative network which is used to generate an attack picture with a real person's picture;

the sample generating unit is configured to, upon completion of training, use the generative network to generate an attack picture, and regard the generated attack picture as the attack sample.

According to a preferred embodiment of the present disclosure, the generative network uses the real person's picture and noise to generate the attack picture.

According to a preferred embodiment of the present disclosure, the network training unit trains a generative adversarial network formed by the generative network and a discriminative network;

wherein the discriminative network is used to discriminate whether an input picture is a real person's picture or an attack picture.

According to a preferred embodiment of the present disclosure, the network training unit is further configured to upon training, use a supervision network to define content of the attack picture generated by the generative network.

According to a preferred embodiment of the present disclosure, the network training unit defines that a human face ID in the generated attack picture does not change as compared with real person's picture used to generate the attack picture.

A computer device, comprising a memory, a processor and a computer program which is stored on the memory and runnable on the processor, wherein the processor, upon executing the program, implements the above-mentioned method.

A computer-readable storage medium on which a computer program is stored, wherein the program, when executed by a processor, implements the aforesaid method.

As can be seen from the above introduction, according to the solutions of the present disclosure, it is feasible to pre-train the generative network which is used to generate an attack picture with a real person's picture, so that upon completion of training, the generative network is used to generate an attack picture, and the generated attack picture is regarded as the attack sample, thereby overcoming the problem about insufficiency of attack samples in the prior art.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
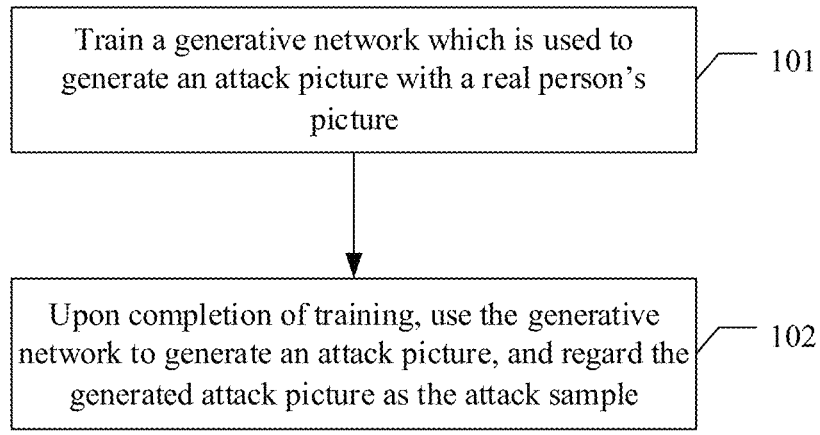
FIG. 1 is a flow chart of a first embodiment of an attack sample generating method according to the present disclosure.

FIG. 1 is a flow chart of a first embodiment of an attack sample generating method according to the present disclosure. As shown in FIG. 1, the embodiment comprises the following specific implementation mode.

In 101 is trained a generative network which is used to generate an attack picture with a real person's picture.

In 102, upon completion of training, the generative network is used to generate an attack picture, and the generated attack picture is regarded as the attack sample.

That is, it is feasible to pre-train a generative network which is used to generate an attack picture with a real person's picture, so that upon completion of training, the generative network is used to generate an attack picture, and the generated attack picture is regarded as the attack sample, thereby overcoming the problem about insufficiency of attack samples in the prior art.

It can be seen that a task of the generative network is to change a real person's picture into an attack picture. Since it is necessary to evaluate whether the generated attack picture meets requirements, preferably it is possible to further introduce a discriminative network. The generative network and the discriminative network jointly form a generative adversarial network.

Figure 2:
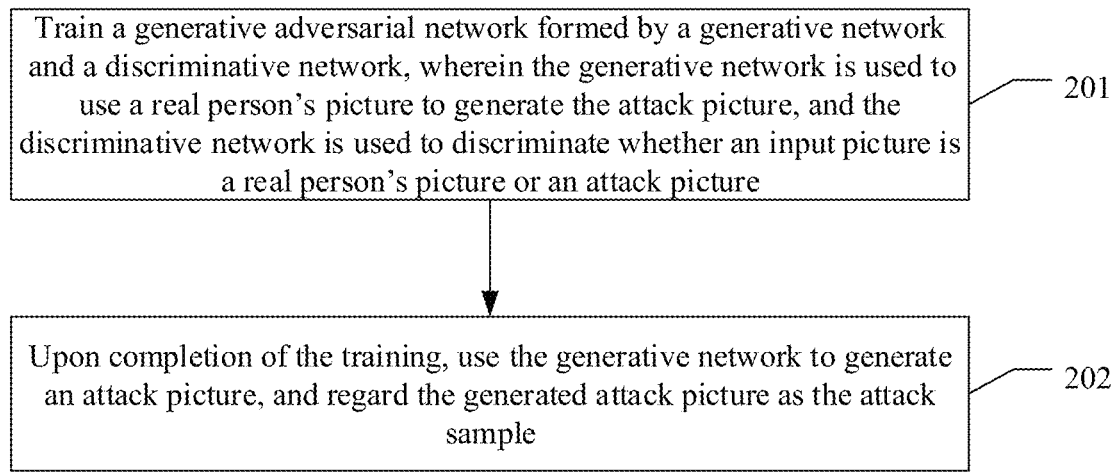
FIG. 2 is a flow chart of a second embodiment of an attack sample generating method according to the present disclosure.

Correspondingly, FIG. 2 is a flow chart of a second embodiment of an attack sample generating method according to the present disclosure. As shown in FIG. 2, the embodiment comprises the following specific implementation mode.

In 201, train the generative adversarial network formed by the generative network and the discriminative network, wherein the generative network is used to use a real person's picture to generate the attack picture, and the discriminative network is used to discriminate whether an input picture is a real person's picture or an attack picture.

In 202, upon completion of the training, the generative network is used to generate an attack picture, and the generated attack picture is regarded as the attack sample.

At present, the generative adversarial network is a hot spot of research in the academic circle. The generative adversarial network is comprised of a generative network and a discriminative network, wherein the generative network may also be called a generator, and the discriminative network may also be called a discriminator.

The generative network tries its best to simulate real distribution to generate a sample, whereas the discriminative network tries its best to discriminate the real sample from the simulation sample generated by the generative network until the discriminative network cannot discriminate the real sample from the simulation sample.

The generative network is like a thief, whereas the discriminative network is like a policeman. The thief aims to manage to deceive the policeman, whereas the policeman aims to mange to refrain from the thief's deception. Both the thief and policeman constantly optimize their purposes to be achieved, and improve themselves under "supervision" of each other.

As far as the present embodiment is concerned, the generative network may use the real person's picture and noise to generate the attack picture. The real person's picture may refer to a picture taken when the real person faces the camera. A plurality of real person's pictures may be pre-obtained. The noise may be random noise. How to generate the attack picture according to the real person's picture and noise belongs to the prior art. The discriminative network is used to discriminate whether the input picture is a real person's picture or an attack picture.

The generative adversarial network is trained mainly to obtain the generative network. How to train the generative adversarial network also belongs to the prior art. Upon completion of the training, when the discriminative network cannot discriminate whether the picture generated by the generative network is a real picture or an attack picture, the generative network may be used to generate the attack picture, and then the generated attack picture is regarded as a desired attack sample.

Subsequently, it is feasible to use the generated attack sample to perform the training of the classification model to thereby overcome the problem about insufficiency of attack samples in the prior art.

In addition, the attack picture generated according to the real person's picture cannot be a messy and meaningless picture. In the case of messy and meaningless picture, the discriminative network can very easily discriminate the attack picture so that the training value gets lost.

To this end, in the present embodiment is proposed that upon training, a supervision network may be used to define the content of the attack picture generated by the generative network.

Preferably, it may be defined that a human face ID in the generated attack picture does not change as compared with real person's picture used to generate the attack picture.

For example, as far as a real person's picture is concerned, it is feasible to extract therefrom a human face feature vector of a fixed dimensionality for example 128 dimensions. After the real person's picture is used to generate an attack picture, it is also feasible to extract from the attack picture a 128-dimensional human face feature vector. A distance between the two human face feature vectors needs to be as small as possible, i.e., as compared with the human face feature vector extracted from the real person's picture, the human face feature vector extracted from the attack picture needs to remain unchanged or change very little, thereby ensuring that a normal human face is still in the generated attack picture.

Figure 3:
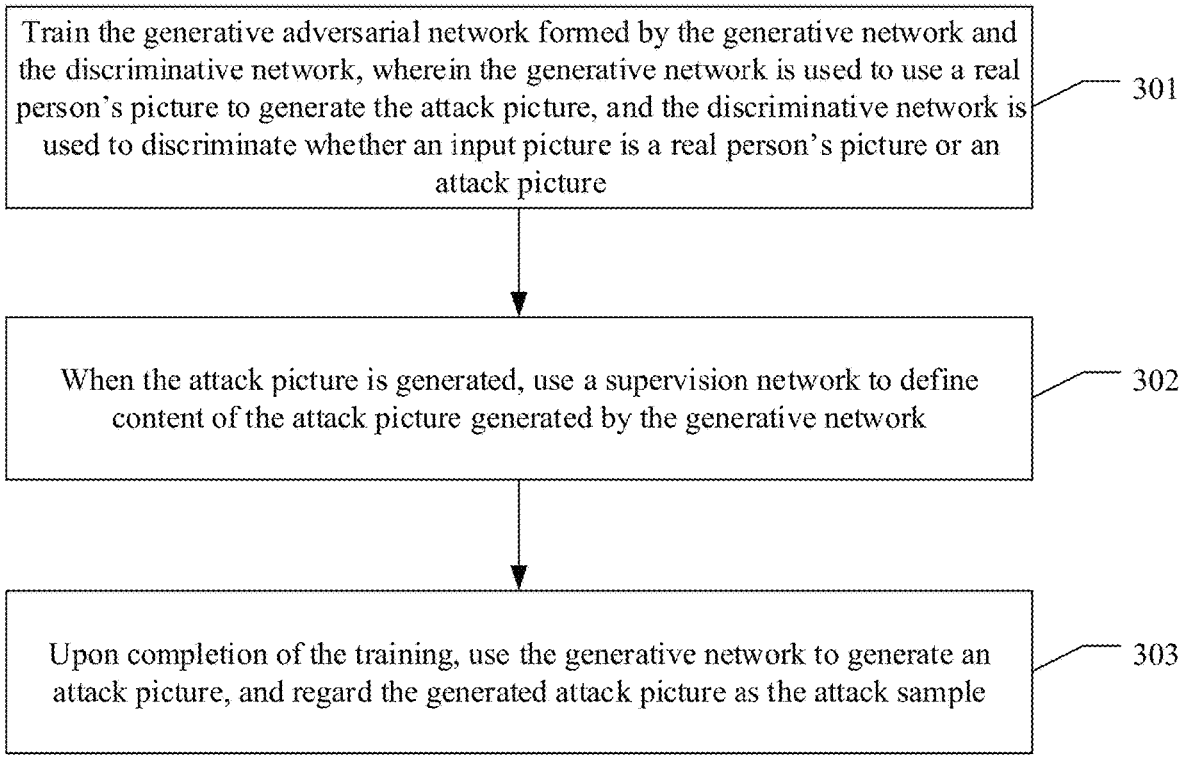
FIG. 3 is a flow chart of a third embodiment of an attack sample generating method according to the present disclosure.

Based on the above introduction, FIG. 3 is a flow chart of a third embodiment of an attack sample generating method according to the present disclosure. As shown in FIG. 3, the embodiment comprises the following specific implementation mode.

In 301, train the generative adversarial network formed by the generative network and the discriminative network, wherein the generative network is used to use a real person's picture to generate the attack picture, and the discriminative network is used to discriminate whether an input picture is a real person's picture or an attack picture.

The generative network may use the input real person's picture and noise to generate the attack picture.

In 302, when the attack picture is generated, a supervision network is used to define content of the attack picture generated by the generative network.

For example, it is defined that a human face ID in the generated attack picture does not change as compared with real person's picture used to generate the attack picture.

In 303, upon completion of the training, the generative network is used to generate an attack picture, and the generated attack picture is regarded as the attack sample.

Upon completion of the training, when the discriminative network cannot discriminate whether the picture generated by the generative network is a real picture or an attack picture, the generative network may be used to generate the attack picture, and then the generated attack picture is regarded as the attack sample.

Subsequently, it is feasible to use the generated attack sample to perform the training of the classification model to thereby overcome the problem about insufficiency of attack samples in the prior art.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

In one word, according to the solutions recited in the above method embodiments, it is feasible to pre-train the generative adversarial network formed by the generative network and discriminative network, and it is feasible to, upon completion of training, use the generative network therein to generate an attack picture, and regard the generated attack picture as the attack sample, thereby overcoming the problem about insufficiency of attack samples in the prior art.

Furthermore, according to the solutions recited in the above method embodiments, the supervision network may be used to define the content of the attack picture generated by the generative network, thereby improving the training effect.

The above introduces the method embodiments. The solution of the present disclosure will be further described through an apparatus embodiment.

Figure 4:
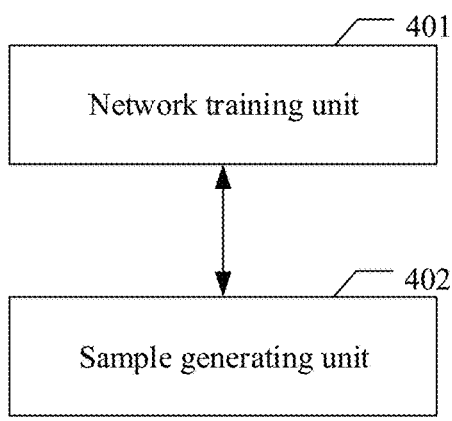
FIG. 4 is a structural schematic diagram of components of an attack sample generating apparatus according to the present disclosure.

FIG. 4 is a structural schematic diagram of components of an attack sample generating apparatus according to the present disclosure. As shown in FIG. 4, the apparatus comprises: a network training unit 401 and a sample generating unit 402.

The network training unit 401 is configured to train a generative network which is used to generate an attack picture with a real person's picture.

The sample generating unit 402 is configured to, upon completion of training, use the generative network to generate an attack picture, and regard the generated attack picture as the attack sample.

That is, the network training unit 401 may pre-train the generative network, and upon completion of training, the sample generating unit 402 may use the generative network to generate an attack picture, and then regard the generated attack picture as the attack sample.

It can be seen that a task of the generative network is to change a real person's picture into an attack picture. Since it is necessary to evaluate whether the generated attack picture meets requirements, preferably it is possible to further introduce a discriminative network. The generative network and the discriminative network jointly form a generative adversarial network.

Correspondingly, the network training unit 401 may train the generative adversarial network formed by the generative network and the discriminative network, wherein the discriminative network is used to discriminate whether an input picture is a real person's picture or an attack picture.

At present, the generative adversarial network is a hot spot of research in the academic circle. The generative adversarial network is comprised of the generative network and the discriminative network.

The generative network tries its best to simulate real distribution to generate a sample, whereas the discriminative network tries its best to discriminate the real sample from the simulation sample generated by the generative network until the discriminative network cannot discriminate the real sample from the simulation sample.

The generative network is like a thief, whereas the discriminative network is like a policeman. The thief aims to manage to deceive the policeman, whereas the policeman aims to mange to refrain from the thief's deception. Both the thief and policeman constantly optimize their purposes to be achieved, and improve themselves under "supervision" of each other.

As far as the present embodiment is concerned, the generative network may use the real person's picture and noise to generate the attack picture. The real person's picture may refer to a picture taken when the real person faces the camera. A plurality of real person's pictures may be pre-obtained. The noise may be random noise. How to generate the attack picture according to the real person's picture and noise belongs to the prior art. The discriminative network is used to discriminate whether the input picture is a real person's picture or an attack picture.

The generative adversarial network is trained mainly to obtain the generative network. How to train the generative adversarial network belongs to the prior art. Upon completion of the training, when the discriminative network cannot discriminate whether the picture generated by the generative network is a real picture or an attack picture, the sample generating unit 401 may use the generative network to generate the attack picture, and then regard the generated attack picture as a desired attack sample.

In addition, the attack picture generated according to the real person's picture cannot be a messy and meaningless picture. In the case of messy and meaningless picture, the discriminative network can very easily discriminate the attack picture so that the training value gets lost.

To this end, the network training unit 401 may further be configured to use a supervision network to define the content of the attack picture generated by the generative network.

Preferably, it may be defined that a human face ID in the generated attack picture does not change as compared with real person's picture used to generate the attack picture.

For example, as far as a real person's picture is concerned, it is feasible to extract therefrom a human face feature vector of a fixed dimensionality for example 128 dimensions. After the real person's picture is used to generate an attack picture, it is also feasible to extract from the attack picture a 128-dimensional human face feature vector. A distance between the two human face feature vectors needs to be as small as possible, i.e., as compared with the human face feature vector extracted from the real person's picture, the human face feature vector extracted from the attack picture needs to remain unchanged or change very little, thereby ensuring that a normal human face is still in the generated attack picture.

Reference may be made to corresponding depictions in the aforesaid method embodiment for a specific workflow of the apparatus embodiment shown in FIG. 4. The workflow is not detailed any more.

In one word, according to the solution recited in the above apparatus embodiment, it is feasible to pre-train the generative adversarial network formed by the generative network and discriminative network, and it is feasible to, upon completion of training, use the generative network therein to generate an attack picture, and regard the generated attack picture as the attack sample, thereby overcoming the problem about insufficiency of attack samples in the prior art.

Furthermore, according to the solutions recited in the above method embodiments, the supervision network may be used to define the content of the attack picture generated by the generative network, thereby improving the training effect.

Figure 5:
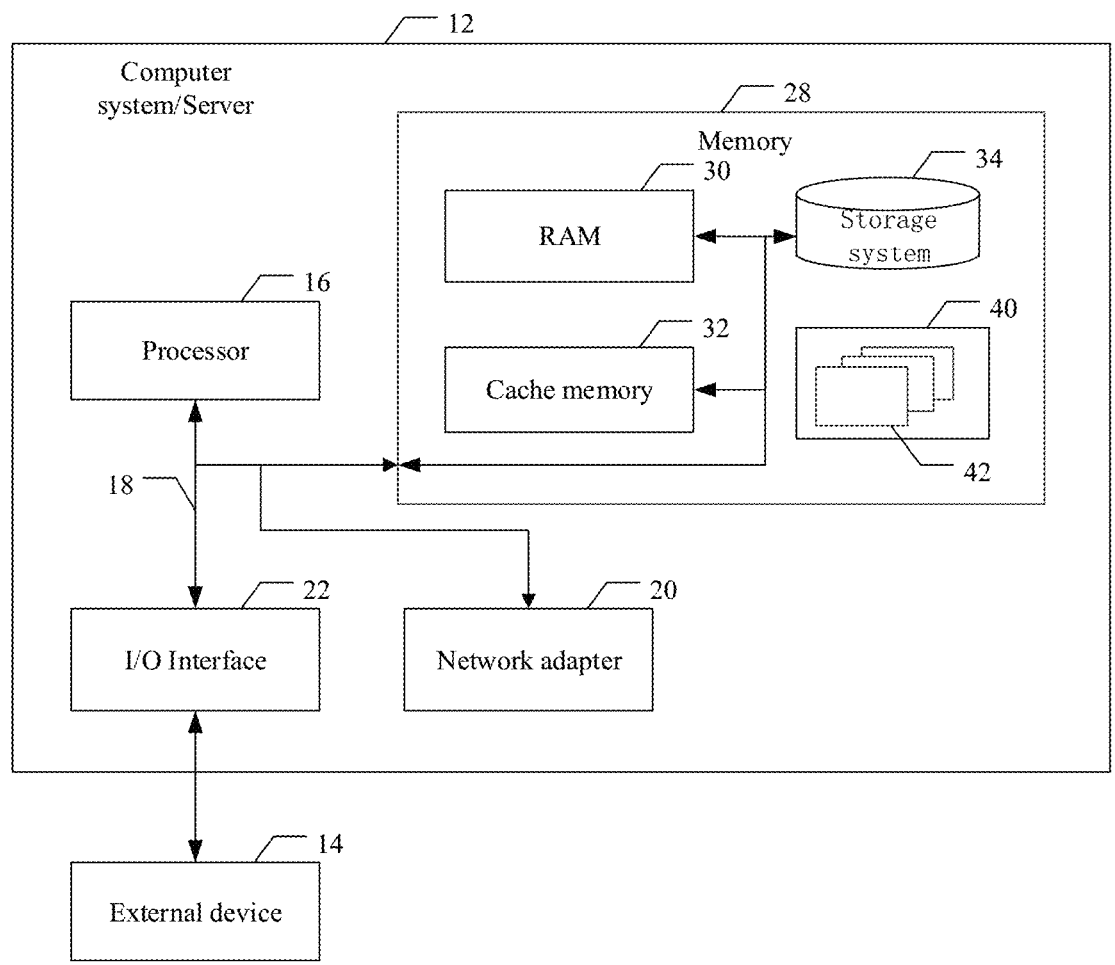
FIG. 5 illustrates a block diagram of an example computer system/server 12 adapted to implement an implementation mode of the present disclosure.

FIG. 5 illustrates a block diagram of an example computer system/server 12 adapted to implement an implementation mode of the present disclosure. The computer system/server 12 shown in FIG. 5 is only an example and should not bring about any limitation to the function and scope of use of the embodiments of the present disclosure.

As shown in FIG. 5, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 5, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1 or 2, namely, train a generative network which is used to generate an attack picture with a real person's picture; upon completion of training, use the generative network to generate an attack picture, and use the generated attack picture as the attack sample.

Preferably, it is feasible to train the generative adversarial network formed by the generative network and the discriminative network, wherein the discriminative network is used to discriminate whether an input picture is a real person's picture or an attack picture.

Reference may be made to related depictions in the above embodiments for specific implementations, which will not be detailed any more.

The present disclosure meanwhile provides a computer-readable storage medium on which a computer program is stored, the program, when executed by a processor, implementing the method stated in the embodiment shown in FIG. 1, 2 or 3.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An attack sample generating method, wherein the method comprises:
training a generative network which is used to generate an attack picture with a real person's picture;
upon completion of training, using the generative network to generate an attack picture, and regarding the generated attack picture as the attack sample,
wherein the training the generative network comprises:
training a generative adversarial network formed by the generative network and a discriminative network,
wherein the discriminative network is used to discriminate whether an input picture is a real person's picture or an attack picture.

2. The method according to claim 1, wherein
the generating an attack picture with a real person's picture comprises:
using the real person's picture and noise to generate the attack picture.

3. The method according to claim 1, wherein
the method further comprises:
upon training, using a supervision network to define content of the attack picture generated by the generative network.

4. The method according to claim 3, wherein
the defining content of the attack picture generated by the generative network comprises:
defining that a human face ID in the generated attack picture does not change as compared with real person's picture used to generate the attack picture.

5. A computer device, comprising a memory, a processor and a computer program which is stored on the memory and runnable on the processor, wherein the processor, upon executing the program, implements an attack sample generating method, wherein the method comprises:
training a generative network which is used to generate an attack picture with a real person's picture;
upon completion of training, using the generative network to generate an attack picture, and regarding the generated attack picture as the attack sample,
wherein the training the generative network comprises:
training a generative adversarial network formed by the generative network and a discriminative network,
wherein the discriminative network is used to discriminate whether an input picture is a real person's picture or an attack picture.

6. The computer device according to claim 5, wherein
the generating an attack picture with a real person's picture comprises:
using the real person's picture and noise to generate the attack picture.

7. The computer device according to claim 5, wherein
the method further comprises:
upon training, using a supervision network to define content of the attack picture generated by the generative network.

8. The computer device according to claim 7, wherein
the defining content of the attack picture generated by the generative network comprises:
defining that a human face ID in the generated attack picture does not change as compared with real person's picture used to generate the attack picture.

9. A non-transitory computer-readable storage medium on which a computer program is stored, wherein the program, when executed by a processor, implements an attack sample generating method, wherein the method comprises:
training a generative network which is used to generate an attack picture with a real person's picture;
upon completion of training, using the generative network to generate an attack picture, and regarding the generated attack picture as the attack sample,
wherein the training the generative network comprises:
training a generative adversarial network formed by the generative network and a discriminative network,
wherein the discriminative network is used to discriminate whether an input picture is a real person's picture or an attack picture.

10. The non-transitory computer-readable storage medium according to claim 9, wherein
the generating an attack picture with a real person's picture comprises:
using the real person's picture and noise to generate the attack picture.

11. The non-transitory computer-readable storage medium according to claim 9, wherein
the method further comprises:
upon training, using a supervision network to define content of the attack picture generated by the generative network.

12. The non-transitory computer-readable storage medium according to claim 11, wherein
the defining content of the attack picture generated by the generative network comprises:
defining that a human face ID in the generated attack picture does not change as compared with real person's picture used to generate the attack picture.

\* \* \* \* \*